Feb. 1, 1955 L. PILLEMER 2,701,226
PROPHYLACTIC AGENT EFFECTIVE AGAINST HEMOPHILUS PERTUSSIS
INFECTIONS (WHOOPING COUGH) AND METHOD OF PRODUCING SAME
Filed Nov. 30, 1951
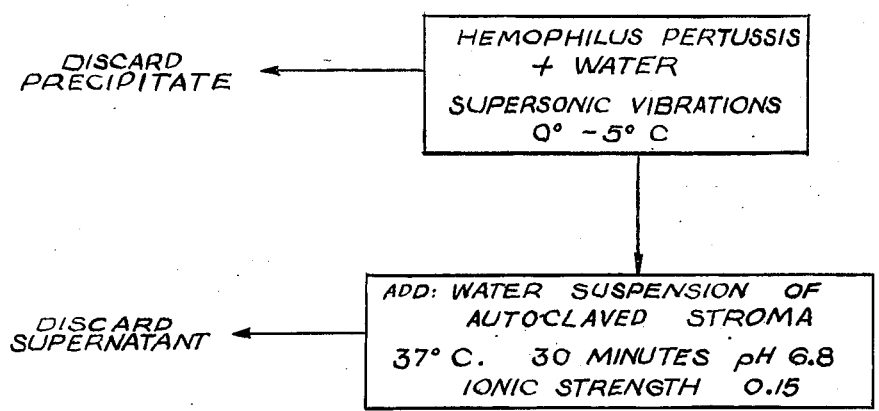
INVENTOR.
LOUIS PILLEMER
BY
ATTORNEYS

United States Patent Office 2,701,226
Patented Feb. 1, 1955

2,701,226

PROPHYLACTIC AGENT EFFECTIVE AGAINST HEMOPHILUS PERTUSSIS INFECTIONS (WHOOPING COUGH) AND METHOD OF PRODUCING SAME

Louis Pillemer, Cleveland, Ohio, assignor to Western Reserve University, Cleveland, Ohio, a corporation of Ohio Application November 30, 1951, Serial No. 259,296

3 Claims. (Cl. 167—78)

This invention relates to prophylactic agents effective against *Hemophilus pertussis* infections and methods of making them which result in stable, sterile, preparations which are free from bacterial toxin and other bacterial components which are known to give undesirable reactions when administered to a patient.

One of the objects of this invention is to produce a new agent effective against *Hemophilus pertussis* infections.

Another object is to produce such an agent which is free from the objectionable material above-mentioned.

Another object is to produce such an agent which may be administered with high effect in extremely small dosages.

Another object of the invention is to provide a new method for producing such an agent.

Another object is to provide such a method which may be carried out simply and inexpensively giving high yields and extremely pure end products.

Another object is to provide such a method which produces a sterile product with a minimum destructive effect to the protective antigens involved.

Other objects and advantages of the invention will appear from the following description of the method and product.

Generally speaking, the method of producing the prophylactic agent against *Hemophilus pertussis* infections consists in first creating a sterile solution in water of the water-soluble antigens of *Hemophilus pertussis* and primarily phase I *Hemophilus pertussis* by subjecting a water suspension of such bacteria to supersonic vibrations which disintegrate the bacteria and leave the water-soluble antigens in solution. After the bacteria are subjected to supersonic vibrations, which is preferably carried out at a temperature of 0° C. to 5° C., the supernatant liquid is separated from the bacterial and other insoluble residue. The water-soluble antigens are then combined with stroma, and preferably human stroma from Rh negative group "O" red blood cells, which have been autoclaved to sterility, to render the water-soluble antigens water-insoluble. This is done under controlled conditions at a temperature of from 30° C. to 40° C., preferably 37° C., and under controlled conditions of pH in which a buffer such as Eagle's solution is employed to maintain the pH between 6.5 to 7.0, preferably 6.8, and the ionic strength between 0.075 to 1.35, preferably 0.15, which is isotonic with body fluids. After the precipitation the precipitate which contains the active principle is separated from the supernatant. It is then suspended in a glycine phosphate buffer at a pH of 7.4 containing 0.3 M glycine.

In carrying out the process above described, the supersonic treatment of the bacteria should be carried out preferably at from 0° C. to 5° C. to prevent loss or damage to the antigens, although the supersonic treatment may be carried out at a higher temperature with adequate controls.

A suitable machine for the supersonic treatment is a Raytheon Model DF 101 10 kc. oscillator-magnetostrictive operating at 60 cycles and 115 volts, which is a 10-kilocycle, 200-volt output oscillator which is manufactured by the Raytheon Manufacturing Company of Waltham, Massachusetts.

The treatment in the oscillator is conducted for a sufficient length of time to break up the bacteria and render the solution sterile. The preferred time with the above oscillator is 45 minutes, although this may vary from 15 minutes to 2 hours. This time may vary with other machines.

After the supersonic treatment of the bacteria, concentrated Eagle's solution is added, the final pH being adjusted to 6.8, or within the range of 6.5 to 7.0. The Eagle's solution consists of a solution of 17 grams of NaCl, 1.36 grams of $KH_2PO_4$ and 0.35 gram of NaOH made up in 100 ml. distilled water. The mixture is allowed to stand overnight at 1° C. Thereafter it is centrifuged at 4,000 R. P. M. for one hour on two different occasions and the precipitate is discarded.

Thereafter autoclaved stromata are added to the supernatant, which is allowed to incubate at from 30° C. to 40° C., preferably 37° C., for from 5 minutes to 4 hours, but preferably for 30 minutes.

This mixture is then centrifuged at 1° C. for an hour at 4,000 R. P. M. and the supernatant is discarded.

The precipitate is then suspended in glycine phosphate buffer, as above set forth, and is shaken vigorously to obtain a smooth suspension.

The following is an illustrative example of the invention which is illustrated in the drawing which is a flow sheet representing the process diagrammatically:

Phase I *Hemophilus pertussis* are suspended to 500 billion per ml. in distilled water.

This suspension is subjected to supersonic treatment in the above-mentioned Raytheon oscillator in 45 ml. amounts for 45 minutes at 0° C.

To each 95 ml. of supersonic extract are added 5 ml. concentrated Eagle's solution. The final pH is adjusted to 6.8.

This mixture is allowed to stand overnight at 1° C. It is then centrifuged at 1° C. for 1 hour at 4,000 R. P. M. and the precipitate is discarded. The supernatant is re-centrifuged at 1° C. for 1 hour at 4,000 R. P. M. and the precipitate is discarded.

To each 100 ml. of supersonic extract are added 3.3 ml. of autoclaved stroma in a water suspension consisting of 50% water and 50% stroma. The amount of stroma suspension may vary from 0.066 ml. to 33 ml. with satisfactory results. This mixture is incubated at 37° C. for 30 minutes. It is shaken several times during incubation. It is then centrifuged at 1° C. for 1 hour at 4,000 R. P. M. and the supernatant is discarded.

The precipitate is suspended in glycine phosphate buffer containing 0.3 M glycine at a pH of 7.4. It is shaken vigorously to obtain a smooth suspension.

Sterility is maintained throughout. The final product contains less than 1% of the bacterial residue and is an effective prophylactic agent against *Hemophilus pertussis*. It is stable, nontoxic and sterile. It maintains substantially the full strength of the initial bacteria as a prophylactic agent.

The prophylactic agent produced is effective against *Hemophilus pertussis* infections, is sterile and is free from the bacterial toxin and other undesirable portions of the bacteria.

The stroma employed should be stroma from Rh negative group "O" red blood cells since the final product can be employed universally, whereas there may be some complications in administering the product made from the stroma of other blood, including animals, which, however, will produce an active prophylactic agent when used in connection with the process.

As pointed out above, the most satisfactory results are obtained if the temperature is maintained between 0° C. and 5° C. during supersonic treatment and the separation of the solids from the supersonic extract.

The stroma will not combine with the water-soluble antigens at this temperature. However, when the temperature is raised the combination takes place. It is most effective at 37° C., although effective results are obtained between 30° C. and 40° C.

As pointed out above, the time of treatment with the supersonic vibrations may vary greatly depending upon the machine or the quantity of material treated. The treatment should continue until the bacteria are disintegrated.

It is preferred to maintain the ionic strength as indicated within a range of 0.075 to 1.35 with 0.15 as the most desirable because it is isotonic with tissue fluids.

The combination between the stroma and the protective antigens takes place between pH 6.5 to 7.0. If this is varied outside of this range, there is a material loss of protective activity.

Although it is preferred to let the material stand up to 72 hours after supersonic treatment at temperatures from 0° C. to 5° C., centrifuging may be done immediately after the supersonic vibrations have been used.

The time for the reaction between the stroma and the soluble antigens may be varied. From 5 minutes to 4 hours will give satisfactory results with preferred results obtained with 30 minutes.

The above examples of the process and product are given by way of illustration without any intention of limiting the process or product to the specific ones described in the examples. It will be apparent to those skilled in the art that variations can be made within the terms of the appended claims.

I claim:

1. The method of producing a stable, nontoxic prophylactic agent, substantially free of bacterial and culture media components which give undesirable reactions in patients and effective against *Hemophilus pertussis* infections comprising making a sterile solution in water of the water-soluble protective antigens of *Hemophilus pertussis* by disintegrating *Hemophilus pertussis* in water at from 0° C. to 5° C., by supersonic vibrations separating the supernatant liquid and thereafter precipitating said antigens from said supernatant liquid by mixing said solution of them with sterile suspensions in water of autoclaved stroma at a temperature of 37° C. for 30 minutes in solution buffered to a pH of 6.8 and having an ionic strength of 0.15 and separating the precipitated material for prophylactic use.

2. The method of producing a sterile, stable, nontoxic prophylactic agent, substantially free of bacterial and culture media components which give undesirable reactions in patients and effective against *Hemophilus pertussis* infections comprising making a sterile solution in water of the water-soluble protective antigens of *Hemophilus pertussis* by disintegrating *Hemophilus pertussis* in water at from 0° C. to 5° C., by supersonic vibrations separating the supernatant liquid, thereafter precipitating said antigens from said supernatant liquid by mixing said solution of them with sterile suspensions in water of autoclaved stroma at a temperature of from 30° C. to 40° C. in solution buffered to a pH of from 6.5 to 7.0 and separating the precipitated material for prophylactic use.

3. A sterile, nontoxic prophylactic agent effective against *Hemophilus pertussis* infections comprising water-soluble protective antigens of phase I *Hemophilus pertussis* substantially free from bacterial toxin and other bacterial components adsorbed on sterilized stroma from Rh group "O" red blood cells.

References Cited in the file of this patent

UNITED STATES PATENTS

| | | |
|---|---|---|
| 2,230,997 | Chambers et al. | Feb. 11, 1941 |
| 2,405,740 | Flosdorf | Aug. 13, 1946 |

OTHER REFERENCES

Flosdorf et al.: Article in Proc. Soc. Exptl. Biol. and Med., pages 122 to 126, May 1939.

Olivier-Gonzalez: Article in J. Infect. Dis., vol. 74, pp. 81 to 84.

Knight: Science, vol. 101, No. 2618, March 2, 1945, pages 231 and 232.

Francis: Science, vol. 96, No. 2500, November 27, 1942, pp. 499 and 500.

Boyd: "Fundamentals of Immunology," 2nd ed., publ. 1947 by Interscience Publ. Inc., N. Y. C., page 295.